Figure 1:
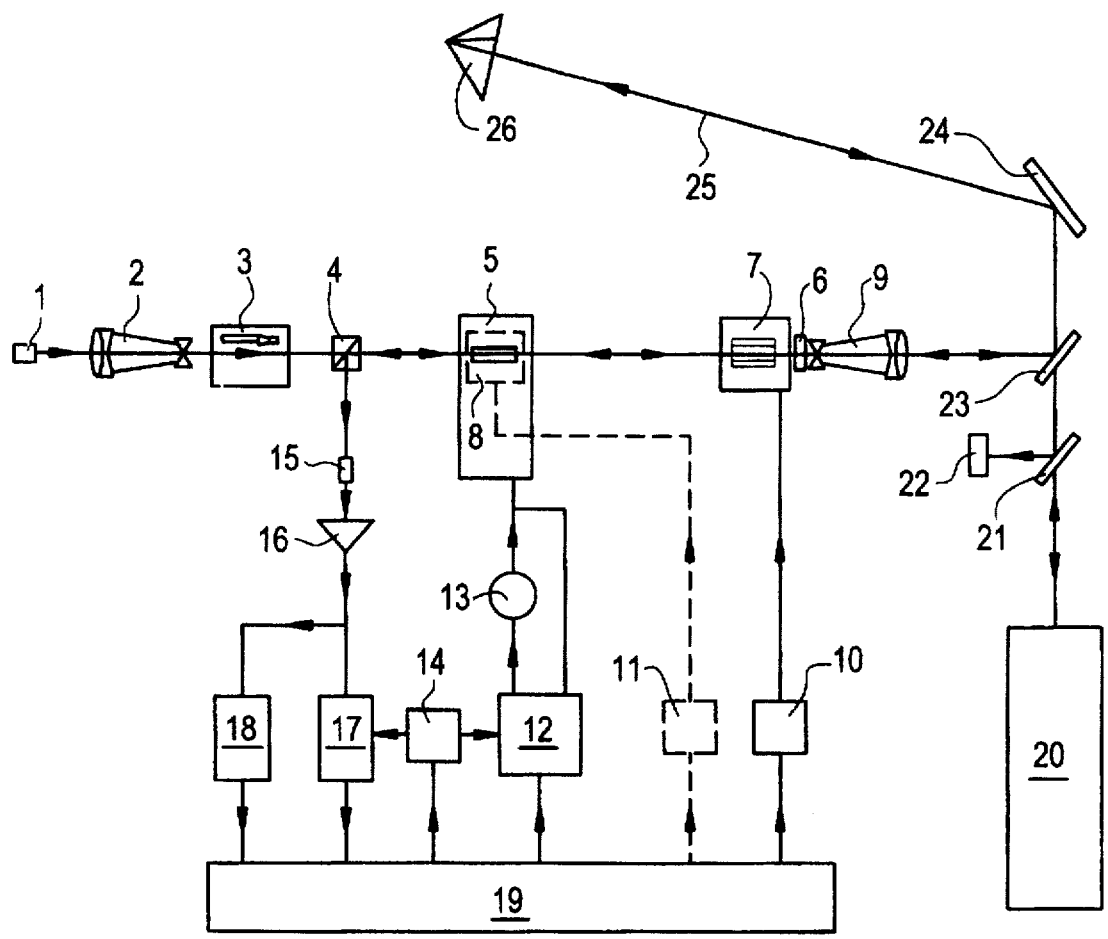

United States Patent [19]

Meier

[11] Patent Number: 5,764,360

[45] Date of Patent: Jun. 9, 1998

[54] ELECTRO-OPTICAL MEASURING DEVICE FOR ABSOLUTE DISTANCES

[75] Inventor: Dietrich Meier, Niedererlinsbach, Switzerland

[73] Assignee: Leica AG, Heerbrugg, Switzerland

[21] Appl. No.: 836,878

[22] PCT Filed: Nov. 13, 1996

[86] PCT No.: PCT/EP96/04955

§ 371 Date: May 28, 1997

§ 102(e) Date: May 28, 1997

[87] PCT Pub. No.: WO97/18486

PCT Pub. Date: May 22, 1997

[30] Foreign Application Priority Data

Nov. 15, 1995 [DE] Germany ............ 195 42 490.5

[51] Int. Cl.⁶ .................................................. G01B 9/02
[52] U.S. Cl. .................................. 356/349; 356/358
[58] Field of Search ............................ 356/345, 349, 356/358

[56] References Cited

U.S. PATENT DOCUMENTS 5,493,395  2/1996  Otsuka ........................ 356/349
5,521,704  5/1996  Thiel et al. ..................... 356/349
5,523,839  6/1996  Robinson et al. ............... 356/349

FOREIGN PATENT DOCUMENTS 2173370  10/1986  United Kingdom.

*Primary Examiner*—David C. Nelms
*Assistant Examiner*—Robert Kim
*Attorney, Agent, or Firm*—Foley & Lardner

[57] ABSTRACT

Electro-optical measuring device for absolute distances to a target point. In addition to the beam polarization being modulated as is required for the Fizeau method, the invention provides that the modulation means contain a modulator crystal (8; 7) having electrodes which are connected to a variable DC source (11; 10), and that a control apparatus (19) is provided which initiates the determination of the value of the modulation phase in the region of minimum brightness at the associated modulation frequency, successively for different DC voltage values, over a full cycle of the basic polarization of the modulator crystal, stores and averages the measured values, repeats the measurement at a slightly changed modulation frequency if the mean value is not zero, and uses interpolation to determine the modulation frequency which is associated with the mean modulation phase value of zero. The measuring device is particularly suitable for coupling to a tracking system based on interferometry.

9 Claims, 1 Drawing Sheet

ELECTRO-OPTICAL MEASURING DEVICE FOR ABSOLUTE DISTANCES

The invention relates to an electro-optical measuring device for absolute distances to a target point having means for producing a collimated, linear-polarized laser beam, electro-optical modulation means for modulating and demodulating the polarization of the laser beam with a specific sequence of modulation frequencies, a reflector which is coupled to the target point, electro-optical detection means for determining the value of the modulation phase in the region of minimum brightness between the transmitted, modulated laser beam and the demodulated laser beam received from the target point, and for determining the associated modulation frequency, as well as having means for calculating the distance from two adjacent modulation frequencies with the modulation phase zero.

Such a measuring device is disclosed in EP 0 205 406 B1. The principle on which this measuring device is based corresponds to the so-called toothed-wheel method according to Fizeau. In this case, a light beam was originally interrupted cyclically by a toothed wheel, then transmitted to a reflector, and finally interrupted cyclically a second time on the toothed wheel. If the returning light beam is extinguished, its propagation time can be determined from the rotation speed of the toothed wheel by comparison with the delay time between a tooth of the toothed wheel and the next tooth gap.

In the case of the measuring device which is disclosed in EP 0 205 406 B1, an electro-optical crystal is used as the modulator instead of the toothed wheel. In this case, the measurement beam is no longer interrupted periodically, but elliptical polarization is varied periodically. If a linear-polarized light beam, whose polarization plane with respect to the crystal axes is located suitably, is modulated in the electro-optical crystal with a sinusoidal signal at several 100 MHz, and if reflected beam elements experience a further modulation when they pass through the crystal a second time in the opposite direction, the linear polarization, which was originally constant with respect to time, is obtained again at certain modulation frequencies, and brightness cancellation is observed on a suitable polarization analyzer.

In this case, at any given moment, precisely an integer number of modulation wavelengths occur on twice the measurement distance between the modulator crystal and the reflector. If no brightness minimum is observed, then such a minimum can be induced by varying the measurement distance or the modulation wavelength. The modulation wavelength is varied via the modulation frequency, which is proportional to the propagation time of the modulation wavelengths. The condition for an integer number of modulation wavelengths on the measurement path can clearly be set for different modulation frequencies. The absolute distance can then be determined unambiguously from two such adjacent modulation frequencies.

Lithium-tantalate crystals are preferably used as modulators since they require a relatively low modulation voltage for the polarization modulation. The AC modulation voltage is in this case normally applied to the crystal inductively by arranging it in a microwave cavity resonator. However, one disadvantage of these crystals is that the static double refraction, which produces the modulation, is very severely temperature-dependent. This means that the brightness minimum which is evaluated for the measurement principle is flattened as a function of the temperature and can even become the maximum, and the distance measurement: in consequence becomes imprecise or impossible.

In order to compensate for the abovementioned temperature influences, a quarter-wave plate, which is matched to the light wavelength of the measurement beam, may be positioned downstream of the modulator crystal. The measurement beam passes through this quarter-wave plate a second time on its return from the reflector, there being a polarization rotation through 90° during the second passage, and the temperature-dependent double refraction effects of the modulator crystal thus being compensated for at any given time by interchanging the polarization with respect to the crystal axes.

The measuring device is normally used with a retroreflector which is located at the destination point in the beam path direction, for example a corner reflector. The maximum achievable measurement accuracy of such a system is in the μ-range. In order to achieve polarization demodulation that is as complete as possible, it is necessary to ensure that no stray light is superimposed by other optical components, the beam directions of the transmitted beam and of the returning beam correspond, and that the polarization is influenced as little as possible by external components since, otherwise, the compensation mentioned above by means of a quarter-wave plate is disturbed.

Frequency modulation at about 10 kHz and with a shift of 500 kHz is applied to the modulation signal, which is at several 100 MHz, in order to determine the modulation phase, that is to say for sensitive detection of the minimum light brightness. The amplitude of the frequency-demodulated signal is a measure of the modulation phase. In particular, the modulation phase is equal to zero at the brightness minimum (first derivative).

EP 0 313 518 B1 discloses a development of the measuring device described above, in which it is also possible to measure distances to natural objects or reflective sheets. To do this, it is necessary to focus the polarization-modulated, collimated measurement beam onto the target object. This solution is based on the knowledge that, in the case of an expanded beam spot on a target object having a broad scatter characteristic, too many returning beam elements pass through new and inclined paths, with a different modulation effect, during the demodulation in the crystal. In this case, it is not possible to obtain any standard linear polarization for a brightness minimum of the modulation phase. If, on the other hand, focussing is used to work with a very small beam spot, beam elements which are scattered away from the original beam path are simply lost, without concealing the sought minimum in the measuring device. As a result of the beam spot being focussed, in this arrangement, the measurement is largely independent of the direction from which the measurement beam strikes the target point.

Further embodiments of polarization-modulated Fizeau systems are known.

U.S. Pat. No. 3,200,698 discloses a measuring device with which the correct distance to a reflective object can be set. A linear-polarized light beam is polarized elliptically and cyclically by means of a birefringent crystal arranged in a microwave resonator. After being reflected on the object, the elliptical-polarized light beam passes through the crystal again. If the distance of the object is set correctly, the elliptical polarization is converted back to linear polarization and the intensity passed through by an analyzer is minimal. The object is shifted from a predetermined position using a micrometer spindle until the minimum signal is set.

U.S. Pat. No. 3,424,531 discloses a distance measuring device in which two measurement beams at different wavelengths are aimed at a measurement object. A modulator, which cyclically interrupts the beam, is located in a forward and return path over which both beams pass jointly. The measurement method corresponds to that of the toothed wheel method. Using different wavelengths for the measurement is intended to take account of atmospheric turbulence and changes in the refractive index in the measurement path, and thus to allow correction of the path length measurement.

SU 882 734 C discloses a mobile robot which contains an optical measuring device for measuring absolute distances to a stationary reflector. When the robot moves, the measurement beam is permanently aimed at the reflector via an automatically controlled tracking mirror. The distance measurement device operates with an amplitude-modulated laser beam and is considerably less accurate than the Fizeau method described above.

U.S. Pat. No. 4 714 339 C discloses a fixed-position apparatus for automatically tracking a reflector which is mounted on a robot arm, by means of which it is also possible to measure the changes in distance when the reflector moves in three dimensions. A laser interferometer system is used to measure the distances between two reflector locations. Relative distance measurement with such a system is extremely accurate, and is in the sub-µ range.

DE 43 06 884 A1 discloses a phase-modulated laser interferometer which preferably contains a phase modulator in the reference beam path. A heterodyne signal is formed from the phase-modulated reference beam path and the measurement beam path. The phase modulator is driven by a sinusoidal signal, from which a mixed-frequency signal, which is phase-coupled for this purpose, is also derived. The heterodyne signal is multiplicatively mixed with the mixed frequency and, after bandpass filtering, is evaluated along the measurement path, in terms of the path difference to be measured. The method makes it easier to drive the phase modulator.

In the case of interferometers, for absolute distance statements, the measurement must start from a defined reference point and must not be interrupted. The laser beam is subject to very stringent requirements in terms of coherence and mode stability.

When attempts are made to use an automatically controlled tracking mirror to aim the laser beam of a measuring device, which is operating using the Fizeau method, at a reflector which is arranged such that its position varies, it has been found that the polarization of the measurement beam is varied so severely by the reflection on the tracking mirror, which is positioned obliquely with respect to the beam direction, and by the obliquely positioned surfaces of the corner reflector, that the brightness minimum to be measured can no longer be detected sufficiently accurately to allow the system to achieve its potential measurement accuracy.

The invention is thus based on the object of making the dependency of the measurement accuracy of a measuring device operating using the Fizeau method largely independent of the characteristics of the modulator crystal, of disturbance light influences and of externally applied additional polarization. This is intended, in particular, to ensure that the measuring device can be used in conjunction with a beam-deflecting tracking mirror and in combination with an interferometer measurement system.

In the case of a measuring device of the type mentioned initially, this object is achieved according to the invention in that the modulation means contain a modulator crystal having electrodes which are connected to a variable DC source, and a control apparatus is provided which initiates the determination of the value of the modulation phase in the region of minimum brightness at the associated modulation frequency, successively for different DC voltage values, over a full cycle of the basic polarization of the modulator crystal, stores and averages the measured values, repeats the measurement at a slightly changed modulation frequency if the mean value is not zero, and uses interpolation to determine the modulation frequency which is associated with the mean modulation phase value of zero.

The DC-voltage-dependent polarization can be superimposed on the normal modulator crystal. However, it is advantageous if two modulator crystals are arranged one behind the other, one carrying out the radio frequency polarization modulation, and the other producing a DC-voltage-dependent basic polarization. In particular, this avoids design difficulties which result from a modulator crystal being arranged in a microwave cavity resonator.

The control apparatus advantageously contains a generator in order to increase the DC voltage values step-by-step over one cycle of the basic polarization.

The DC voltage which is applied to the modulator crystal changes its basic polarization. Basic polarization is defined as that polarization which occurs in the absence of radio-frequency modulation and when linearpolarized light enters at 45° to the vertically directed optical z-axis at the crystal output. Depending on the given crystal length, the position of the basic polarization is repeated cyclically at specific DC voltage values. If a lithium-tantalate crystal is used, for example, about 500 volts are required to change the basic polarization through 360°, that is to say to delay the s-component, which oscillates at right angles to the optical axis, through 360° with respect to the p-component, which oscillates parallel to the optical axis.

According to the invention, once an identifiable brightness minimum has been found, the basic polarization is varied once over one full cycle in each case at the modulation frequency associated with this value. An average modulation phase is obtained by passing through one full cycle of the basic polarization so that only the correct determination of the modulation frequency is critical for the further measurement. This is identified by the fact that the values of the modulation phase, which are determined as a function of the basic modulation, become zero on average only when the selected modulation frequency corresponds to the modulation frequency corresponding to the minimum of the modulation phase. By varying the modulation frequency step-by-step in the vicinity of the brightness minimum, the associated value of the modulation frequency can be interpolated from the values of the averaged modulation phase.

The basic polarization should be varied over one full cycle. Because the light passes through the crystal twice, an entire cycle occurs at the detector even when the half-cycle voltage is applied to the crystal, because the delay in the s-component and p-component is 180° in each case for the forward path and return path. However, the change in the basic polarization is advantageously produced over one entire cycle on the crystal, since it has been found that: the two cycles of measured values which are produced in this case at the detector do not correspond exactly. This is a result of the fact that the start and the end of the cycles of the basic polarization are temperature-dependent and therefore undefined. Averaging over two cycles at the detector thus gives an improved mean value.

In the case of the measuring device according to the invention, the reflector can now be arranged such that it can move freely in three dimensions, and the laser beam can be slaved to the reflector via an automatically controlled tracking mirror. The laser beam is expediently passed to the tracking mirror via a splitter mirror, so that part of the laser beam returning from the reflector can be passed through the splitter mirror to a position-sensitive detector, which carries out the slaving of the tracking mirror.

In particular, it is also possible to use a dichroic splitter mirror, so that a different wavelength can be used for tracking control and deflection angle determination than for the measuring device. In particular, the laser interferometer system which has been disclosed in U.S. Pat. No. 4 714 339 C and has tracking control via the dichroic splitter mirror can be coupled to the laser beam for the absolute distance measurement, and can be decoupled from it again when said laser beam returns from the reflector. This may be advantageous since the heterodyne interferometer system which is advantageously used as a coherent light source requires a HeNe laser, while a laser diode can be used for the Fizeau measurement system since the only critical factor in this case is the characteristic of linear polarization for the electro-optical polarization modulation.

However, since the laser beam which is used in a laser-heterodyne interferometer is also linear-polarized and is not dependent on the light wavelength as in the case of the Fizeau measurement method, the measurement beam of a laser-heterodyne interferometer operating using the Doppler method, as disclosed, for example, in EP 0 194 941 A2, can also advantageously be used as the measurement beam in the Fizeau system. The critical factor is that the polarization modulation in the Fizeau system does not vary the coherence of the interferometer beam, and thus that the evaluation of the Doppler shift in the light frequency is not disturbed. On the other hand, the shift in the light frequency in the heterodyne interferometer does not influence the Fizeau measurement method since, in this case, the only critical factor is the wavelength of the polarization modulation. The polarization modulator can thus be inserted into the beam path coming from the interferometer, and a splitter mirror can be positioned in front of it, via which a part of the beam coming back from the reflector is split off and is deflected in order that the reference beam of the interferometer can be superimposed on it.

The two combinations of a measuring device for absolute distances with a measuring device for relative distances open up, for example, new possibilities for robot calibration. The original coordinates can be measured at rest with the aid of the absolute measurement. The simultaneous evaluation of the interferometer data allows a statement to be made about the mechanical stability and, possibly, oscillation characteristics of the robot system. The interferometer is used to measure a subsequent robot movement. The coordinates of the final position are now provided by the interferometer measurement, but can be checked by a repeated absolute measurement. Coupling the two measurement information items furthermore makes it possible to determine absolute distances to moving targets, with considerably improved accuracy.

Figure 2:
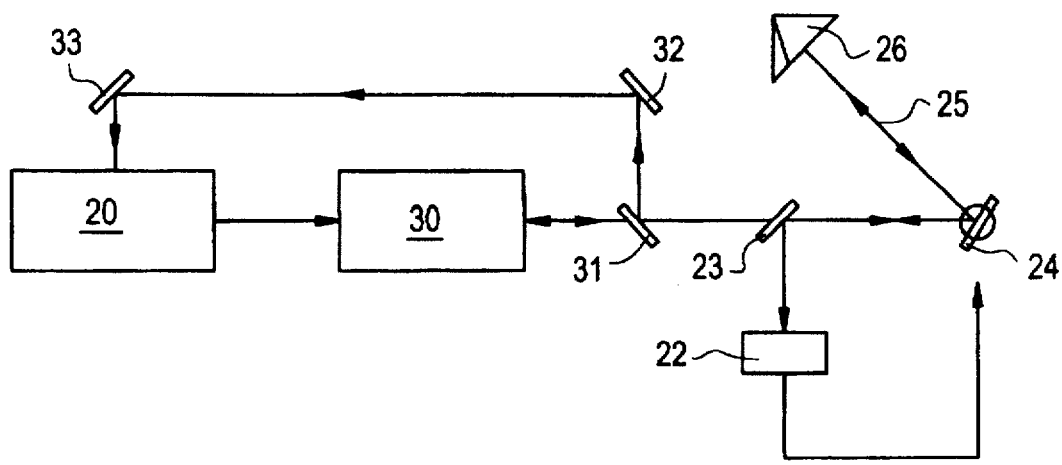

The invention will be described in more detail in the following text with reference to schematically illustrated exemplary embodiments in which, in detail:

FIG. 1 shows the measuring device coupled to a tracking system based on interferometry, and FIG. 2 shows the measuring device integrated in the interferometer beam path of a tracking system.

In FIG. 1, the measurement light is produced by a laser diode 1. This light is linear-polarized to approximately 100:1 by components. After beam focusing optics 2, the narrow, parallel beam passes through an optical isolator 3 which prevents returning light interfering with the laser process. A polarizing beam splitter 4 allows only the prevalent linear-polarization component of the laser diode 1 to enter the Fizeau system. This beam splitter 4 is also used as a polarization analyzer in the Fizeau system. The light which then falls onto the crystal axes, which are positioned at 45°, of an electrooptical modulator 5 is cyclically polarization-modulated at a variable frequency of approximately 850 to 1000 MHz under the influence of an AC electrical field acting on the electro-optical crystal. A quarter-wave plate 6 is used in a known manner to compensate for the temperature-dependent birefringence in the modulator crystal, in that the orientation of the polarization with respect to the crystal axes of the electro-optical modulator is interchanged as a result of the returning light being shifted twice through a quarter of a wavelength.

In order to eliminate the influence of the external additional polarization, which adversely affects the method in which the quarter-wave plate operates, a further electro-optical crystal 7 is provided, to which a DC voltage can be applied via the variable DC source 10. In this case, it is also in principle possible to apply the DC voltage directly to the modulator crystal 8 of the modulator 5 via a variable DC source 11. This is indicated by dashed lines. The birefringence of the crystal could also be varied by temperature change. Because of the technical complexity associated with this, these two alternatives will not be described in any more detail.

An oscillator 13 is used to drive the electrooptical modulator 5 at the variable modulation frequency of, as has already been mentioned, 850 to 1000 MHz, which is provided by programming a phase locked loop 12. The phase locked loop 12 contains a synthesizer, which is not illustrated, and is stabilized to a 10 MHz crystal reference by means of a PLL circuit. All the system functions and evaluations are coordinated and carried out by a control apparatus 19 having a microprocessor.

The required bandwidth of the subsystem which comprises the oscillator 13, the modulator 5 and the phase locked loop 12 is approximately 150 MHz. The frequency is tuned during the measurement sequence such that a minimum amount of returning light strikes a photosensitive diode 15 which is positioned after the beam splitter 4, which acts as an analyzer. An amplifier 16 is used to amplify this measurement signal.

A swept-frequency generator 14 produces sinusoidal frequency modulation in the loop 12, and this is used in a phase-sensitive detector 17 (lock-in amplifier) for detection of the signal minimum. The frequency modulation which is additionally applied improves accurate detection of the minimum. As already mentioned, these minima occur in the case of the Fizeau measurement method at those modulation frequencies at which a given distance to the reflector is a multiple of half of the corresponding modulation wavelength. The absolute distance can be calculated in the control apparatus 19 from the frequencies of two such minima located adjacent to one another.

In contrast to the phase-sensitive detector 17, in which the frequency modulation is measured, the signal strength, that is to say the general light brightness, is measured in an intensity measurement circuit 18. Reference is made to EP 0 205 406 B1, which was mentioned initially, for further information relating to the Fizeau measurement method.

Small beam divergences of the measurement beam are required for measurement distances up to about 100 m. To this end, the beam is broadened in a collimator 9. This broadened beam is injected into and extracted from the measurement beam 25 via a dichroic beam splitter 23. The measurement beam 25 is passed via a tracking mirror 24 to the reflector 26, which is illustrated as a corner reflector.

The polarization of the measurement beam should be changed as little as possible after it emerges from the Fizeau system since, as mentioned initially, additional constant polarization changes, which occur to the polarization modulation, lead to reductions in the sensitivity of the measurement system. Since dielectric layers which are located at an angle to the light beam, such as beam splitter layers for example, have a strong polarization effect, attention should be paid to compensation for or avoidance of polarization influences as far as possible in this case. With a fixed angle, compensation can be achieved by passing the light through two optical components which are identical but rotated through 90° in the beam direction.

This can be implemented in the beam splitter 23 by said beam splitter 23 being composed of two identical beam splitter layers joined together.

The coating of the tracking mirror 24 is also optimized for minimum possible phase differences between vertically polarized and parallel polarized components over the required variable range of incidence angles. However, additional polarizations cannot be avoided either on this component or on the reflector 26.

FIG. 1 furthermore illustrates an interferometer system 20 whose details can be found, for example, in the already mentioned U.S. Pat. No. 4 714 339 C. The measurement beam in this system is at a different wavelength and is likewise injected into and extracted from the measurement beam 25 via the beam splitter 23. Part of the interferometer light returning from the reflector 26 is passed via a further beam splitter 21 to a position-sensitive diode 22 for tracking control.

A single beam splitter 23 can, of course, also be used, which lets through part of the measurement beam belonging to the Fizeau system, and passes it directly to the position-sensitive diode 22, which then controls an autonomous control system.

The measurement algorithm for the Fizeau system, using the measurement of two adjacent minima, is extended according to the invention by an additional sequence, which overcomes the measurement uncertainty resulting from unavoidable, externally applied polarizations.

First of all, a first minimum is sought in the intensity measurement circuit 18 and the phase-sensitive detector 17 by automatically varying the modulation frequency via the synthesizer in the loop 12. At the same time, the detector 1.7 measures the phase and the amplitude of the frequency modulation produced by the swept-frequency generator 14. This is the first derivative of the signal amplitude with respect to frequency. The signal amplitude minimum corresponds to a zero crossing of the amplitude of the frequency modulation.

After looking for the second minimum which is required for the distance calculation, the basic polarization of the modulator 7 is now rotated via the variable DC source 10 over one cycle for the fine measurement at a fixed modulation frequency, which is intended to correspond to the minimum. DC voltages are applied to the modulator 7, for this purpose, in steps from 0 up to twice the half-cycle voltage (for example 500 V). The values which occur in the phase-sensitive detector 17, and vary sinusoidally over the half-cycle voltage are in each case stored in the control apparatus 19 at the same time. Since the lock-in values of the detector 17 are the values of the first derivative of the amplitude values with regard to frequency, the mean value of the stored values is equal to precisely zero when the modulation frequency is precisely at the minimum of the value of the modulation phase.

If the mean value is not zero, the precise position of the minimum can be interpolated by means of a second identical measurement and, if necessary, further identical measurements, at somewhat shifted modulation frequency. The fine measurement can be repeated at further minima, in particular at the first minimum as well. With appropriate substitution in the existing values, this leads to increased measurement certainty and accuracy.

FIG. 2 illustrates a measurement system in which the absolute distance meter is integrated in the interferometer beam path. The interferometer system 20 is, for example, disclosed per se in EP 0 194 941 A2. The Fizeau system 30 is likewise intended to contain all the corresponding elements (4–19) illustrated and described in FIG. 1.

An unbroadened laser beam emerges from the interferometer system 20, which is linear-polarized, modestabilized and frequency-shifted via an acousto-optical modulator. This beam enters the Fizeau system 30 via the polarization analyzer 4 illustrated in FIG. 1 and leaves the system, after the additional polarization modulation, via the collimator 9.

New features in comparison with the arrangement according to FIG. 1 are the beam splitter 31 and the deflection mirrors 32, 33, which can be added to the interferometer system 20. Via these elements part of the beam 25 returning from the reflector 26 is caused to interfere with the reference beam of the interferometer. The polarization modulation which is additionally applied to it in comparison with the reference beam does not disturb the interference.

As in FIG. 1, part of the beam returning from the reflector 26 is passed via the splitter mirror 23 to the position-sensitive detector 22, via which a control signal is produced for the tracking mirror.

I claim:

1. An electro-optical measuring device for absolute distances to a target point having means for producing a collimated, linear-polarized laser beam, electro-optical modulation means for modulating and demodulating the polarization of the laser beam with a specific sequence of modulation frequencies, a reflector which is coupled to the target point, electro-optical detection means for determining the value of the modulation phase in the region of minimum brightness between the transmitted, modulated laser beam and the demodulated laser beam received from the target point, and for determining the associated modulation frequency, as well as having means for calculating the distance from two adjacent modulation frequencies with the modulation phase zero, wherein the modulation means (5) contain a modulator crystal (8; 7) having electrodes which are connected to a variable DC source (11; 10), and a control apparatus (19) is provided which initiates the determination of the value of the modulation phase in the region of minimum brightness at the associated modulation frequency, successively for different DC voltage values, over a full cycle of the basic polarization of the modulator crystal (8; 7), stores and averages the measured values, repeats the measurement at a slightly changed modulation frequency if the mean value is not zero, and uses interpolation to determine the modulation frequency which is associated with the mean modulation phase value of zero.

2. The measuring device as claimed in claim 1, wherein the modulation means (5) contain a modulator crystal (8) which is only frequency modulated, and a further modulator crystal (7) to which a DC voltage is applied.

3. The measuring device as claimed in claim 1, wherein the control apparatus (19) contains a generator in order to increase the DC voltage values step-by-step over one cycle of the basic polarization.

4. The measuring device as claimed in claim 1, wherein the reflector (26) is arranged such that it can move freely in three dimensions, and the laser beam is slaved to the reflector (26) via an automatically controlled tracking mirror (24).

5. The measuring device as claimed in claim 4, wherein the laser beam is passed to the tracking mirror (24) via a splitter mirror (23).

6. The measuring device as claimed in claim 5, wherein a dichroic splitter mirror (23) is provided.

7. The measuring device as claimed in claim 6, wherein said measuring device is coupled to a laser interferometer (20) for relative distance measurement for the movement of the reflector (26), the interferometer beam path and the measuring device beam path being coincident at the dichroic beam splitter (23).

8. The measuring device as claimed in claim 7, wherein the laser wavelengths of the interferometer beam and of the measuring device beam are different.

9. The measuring device as claimed in claim 1, wherein the polarization modulator (8; 7) is inserted, in front of the splitter mirror (31), into the beam path coming from a laser interferometer (20), which splitter mirror (31) splits off part of the beam coming back from the reflector (26) in order to superimpose the reference beam of the interferometer on it.

* * * * *